United States Patent [19]

Bissot

[11] Patent Number: 4,983,432

[45] Date of Patent: Jan. 8, 1991

[54] ETHYLENE VINYL ALCOHOL COPOLYMERS CONTAINING PLATELET-TYPE MICA FILLERS OF MULTI-LAYER CONTAINERS

[75] Inventor: Thomas C. Bissot, Newark, Del.

[73] Assignee: E. I. Du Pont de Nemours and Company, Wilmington, Del.

[21] Appl. No.: 286,784

[22] Filed: Dec. 20, 1988

Related U.S. Application Data

[62] Division of Ser. No. 79,471, Jul. 30, 1987, Pat. No. 4,818,782.

[51] Int. Cl.$^5$ .................... B32B 5/22; B32B 27/08; B32B 5/16; B27N 5/02
[52] U.S. Cl. .................... 428/35.7; 428/36.4; 428/324; 428/515; 524/413; 524/441; 524/449; 524/503
[58] Field of Search ............ 428/35.7, 515, 36.4, 428/324; 524/413, 441, 449, 503

[56] References Cited

U.S. PATENT DOCUMENTS

| | | | |
|---|---|---|---|
| 4,528,235 | 7/1985 | Sachs et al. | 428/220 |
| 4,601,952 | 7/1986 | Doyle et al. | 428/324 |
| 4,606,785 | 8/1986 | Zeise | 428/324 |
| 4,618,528 | 10/1986 | Sachs et al. | 428/216 |
| 4,675,235 | 6/1987 | Wu | 428/324 |
| 4,769,276 | 9/1988 | Gruss et al. | 428/324 |
| 4,818,782 | 4/1989 | Bissot | 524/413 |
| 4,906,495 | 3/1990 | Martini et al. | 428/35.7 |

FOREIGN PATENT DOCUMENTS 51-117751 10/1976 Japan .

*Primary Examiner*—Herbert J. Lilling

[57] ABSTRACT

A barrier resin composition is disclosed is which contains 50 to 95 weight percent ethylene/vinyl alcohol copolymer having a melt flow of 0.1 to 100 g/10 minutes as measured at 210° C. and 50 to 5 weight percent mica having a particle size of less than 74 microns and an aspect ratio of from 10 to 150. The composition can be prepared by melt blending a mixture of the ethylene/vinyl alcohol copolymer and the mica. Alternatively, the composition can be prepared by forming a dispersion of this mica in a solution of the ethylene/vinyl alcohol copolymer followed by precipitating the ethylene/vinyl alcohol copolymer.

9 Claims, No Drawings

ETHYLENE VINYL ALCOHOL COPOLYMERS CONTAINING PLATELET-TYPE MICA FILLERS OF MULTI-LAYER CONTAINERS

CROSS-REFERENCE TO RELATED APPLICATION

This application is a division of U.S. Ser. No. 07/079,471, filed July 30, 198, now U.S. Pat. No. 4,818,782.

BACKGROUND OF THE INVENTION

1. Field Of The Invention

The present invention relates to blends of ethylene vinyl alcohol and finely divided platelet-type mica particles. These compositions are exceptionally effective as a thin barrier layer in multilayer packaging constructions such as bottles, jars, cups, trays and other rigid containers.

2. Prior Art

In recent years major changes have been occurring in the packaging industry as plastic containers have been replacing those made from metal and glass, as well as going into innovative new types of containers. This expansion in the use of plastics has been supported by the development of high barrier resins which are effective in thin layers in reducing the penetration of oxygen as well as flavors and odors during the packaging, transportation and storage of sensitive foods, drugs and chemicals.

The plastic resins commonly used in the packaging industry can be divided into three general classifications based on their permeability to oxygen. The oxygen permeability value (OPV) of polymer films is generally expressed in cubic centimeters per day for a film area of 100 square inches (645 cm$^2$) at a pressure gradient of one atmosphere O$_2$ per mil of film thickness.

The oxygen barrier of many films vary with temperature and relative humidity. Generally oxygen permeability increases with temperature and relative humidity. Since most food products have a high water content or are subject to storage under hot humid conditions, the OPV values disclosed herein are all measured at 80% RH and 30° C. unless reported otherwise.

The high oxygen barrier plastics generally have an OPV of less than 1. This group consists of polyvinylidene chloride copolymers (PVDC), acrylonitrile copolymers (PAN) and ethylene vinyl alcohol copolymers (EVOH). Copolymers of ethylene and vinyl alcohol suitable for use in the present invention can be prepared by the methods disclosed in U.S. Pat. Nos. 3,510,464; 3,560,461; 3,847,845; and 3,585,177. The medium barrier resins generally have an OPV in the range of 1 to 10. These include plastics like nylon 6, nylon 6-6, oriented polyethylene terephthalate (OPET), and rigid polyvinyl chloride (PVC). Low barrier packaging plastics have an OPV of greater than 10 to over 300. These include high density polyethylene (HDPE), polypropylene (PP), polybutylene terephthalate (PBT), and polystyrene (PS).

The use of platelet shaped inorganic fillers to improve the barrier properties of a resinous film is very old technology. These blends of fillers and resins function by forming so-called tortuous paths for diffusion of permeating species through the composite film. The use of aluminum flake powder in paint films to improve moisture barrier and weathering has been utilized since at least the 1890's.

There are a number of examples in the patent literature on the use of inorganic platelet type fillers to improve the barrier properties of low and medium barrier polymers. The use of mica in polyethylene is disclosed in U.S. Pat. No. 3,463,350 to improve the oxygen barrier of rigid molded food containers. U.S. Pat. No. 4,536,425 describes a technique for blending relatively coarse mica plates with a polar thermoplastic, especially PET, and compounding with shear to delaminate the mica platelets.

British Pat. No. 1,136,350 describes the use of platelet type fillers in a variety of low barrier plastics including polyethylene, polypropylene, polystyrene or ethylene copolymers containing at least 50 mole percent of ethylene units. The films are claimed as useful as packaging materials for food, e.g., cereals and potato chips.

U.S. Pat. No. 4,528,235 and U.S. Pat. No. 4,618,528 disclose thin polymer films containing small sized platelet type filler. The polymer has a melt flow rate of from 0.01 to 10grams per 10 minutes at 190° C. to 250° C. as measured on ASTM Test No. D-123B at a load of 1000 to 2160 grams. The preferred polymer is polycaprolactam or high density polyethylene. Ethylene/vinyl alcohol copolymers are also disclosed as being suitable polymers. There is from 10 to 50 percent of a platelet filler having an average equivalent diameter of from 1 to 8 micrometers, a maximum equivalent diameter of about 25 micrometers, and an average thickness of less than 0.5 micrometers. The preferred filler is talc. Ground mica, platelet silicas, flaked metal and flaked glass are also disclosed as being suitable fillers. The film is from 10 to 100 micrometers thick and can be a single ply or a component of a laminate. The use of ethylene/vinyl alcohol copolymers in combination with mica having a high aspect ratio is not disclosed.

The use of platelet type fillers to reduce the permeability of low and medium barrier polymers has been shown to yield a 50% to 300% improvement in barrier properties. However, resulting barrier compositions are still too high in OPV to be used as packaging films or layers of a laminate for the more oxygen sensitive foods, drugs and chemicals now packaged in glass and metal.

The extensive prior art shows the unfilled need for a specific combination of an inexpensive inorganic filler and a high barrier resin which would have a substantially improved barrier and which could be processed on conventional polymer processing and container forming equipment to yield attractive, transparent, packaging with long shelf life.

SUMMARY OF THE INVENTION

The present invention relates to a melt extrudable high barrier composition consisting essentially of an ethylene/vinyl alcohol copolymer filled with small particle size mica platelets having an aspect ratio of greater than 10/1 and, preferably, greater than 25/1.

Films and laminates prepared from these compositions are remarkably transparent for a filled polymer system and thus are suitable for many packaging applications where contact clarity is a requirement.

By selection of the melt flow rate of the ethylene/vinyl alcohol copolymer and the amount of mica filler, the melt flow of the blend can be adjusted to any value between 0.1 and 60 g/10 min. The melt flow of the EVOH and the resulting blend as used herein are measured by ASTM Test No. D-1238 using a 2160 gram load at 210° C. The melt flow of a resin blend is critical in coextrusion of multilayered structures in order to obtain uniform layer thicknesses. The melt flow of the resin blend has been found to be controlled by the relationship $$MF\ blend = (1 - Kc)\ MF\ EVOH$$

where K has a value 0.018±0.004 and where c is the amount of mica in parts per 100 parts resin(phr). The exact value of K is dependent on the particle size distribution of the mica, a grade having a lower average platelet diameter giving a lower value of K. Since ethylene/vinyl alcohol copolymers are known to be difficult to process, it is surprising that any significant amount of a filler could be incorporated therein while still retaining adequate melt processibility.

The barrier blend compositions of this invention have a melt stability value of between 0.5 and 1.2 and preferably between 0.7 and 0.9. The melt stability value is the ratio of the melt flow rate in g/10 min of a resin sample treated at 220° C. for 30 minutes to the melt flow rate of the sample without the heat treatment. This melt stability value is a measure of the thermal stability which is critical to operability in commercial operations, which are generally high speed operations requiring readily processible compositions.

The barrier blend compositions of this invention can be processed into multi-layer structures having one or more barrier layers having an OPV in the high barrier range of less than 1. For use herein oxygen permeation values are measured by ASTM D-3985-81. These blends give an OPV improvement of at least two times and up to four times that of the unfilled high barrier resin as measured at a 30 phr (23 weight percent) mica loading. Thus, these compositions are particularly useful in forming the barrier layer in multi-layer packaging constructions without requiring modification of the processing equipment or conditions and yielding substantially reduced oxygen permeability per unit thickness of barrier layer.

The improvements in barrier to penetrating molecules, particularly oxygen, can be utilized by the package manufacturer to extend the shelf life of the contained products, extend the use of the package to the distribution of more sensitive products, or to reduce container costs by reducing the thickness of the barrier layer.

DETAILED DESCRIPTION OF THE INVENTION

The ethylene/vinyl alcohol copolymers useful in the present invention are ethylene/vinyl acetate copolymers having an ethylene content of 20 to 60 mole percent and preferably 25 to 50 mole percent wherein at least 95% and, preferably, 98% of the acetate groups have been converted to alcohol groups. The composition contains 50-95% by weight of the ethylene/vinyl alcohol polymer and 5-50% by weight of mica having an aspect ratio of greater than 10/1 and preferably greater than 25/1.

If the ethylene content of the resin is greater than 60 mole percent, the resins are not effective as oxygen barriers. The degree of conversion of acetate groups to hydroxyl groups must be great than 95% otherwise inferior oxygen barrier properties are obtained. The melt flow of the resin can be from 0.1 to 100 g/10 minutes and, preferably, 2 to 30 g/10 minutes as measured at 210° C. The ethylene/vinyl alcohol resin used may be of a single composition or may be a blend of two or more ethylene/vinyl alcohol resins. Alternatively, the ethylene/vinyl alcohol polymer may be a terpolymer containing up to 10 weight percent of a third monomer. Alternatively, other resins such as polyamides can be blended with the ethylene/vinyl alcohol resin in such amounts that the ethylene/vinyl alcohol resin remains the major component of the resinous blend.

The platelet-like filler used in the present invention is mica.

Micas are classified into four types, named for the most common mineral in each: muscovite, phlogopite, biotite, and lepidolite. Only the first two have found appreciable commercial usage. Phlogopite mica $KMg_3(AlSi_3O_{10})(OH)_2$ tends to have a low aspect ratio. It also has a high iron content which imparts a brown color to blends. This is generally undesirable in food packaging applications. The preferred type of mica is muscovite, $KAl_2(AlSi_3O_{10})(OH)_2$. Muscovite mica is available in two types, wet and dry ground. The wet ground micas usually have cleaner shapes, smoother surfaces, and higher aspect ratios and, thus, are preferred in the compositions of this invention.

The platelet-type filler should have a small particle size for uniform distribution in the blend. Ninety-five percent of the particles should be smaller than 200 mesh (74 microns) and preferably at least 90% smaller than 325 mesh (44 microns) and most preferably, 99.5% smaller than 400 mesh (38 microns).

The most important feature of the platelet-type fillers which are useful in this invention is that they have a high aspect ratio. The aspect ratio is defined as the weight averaged ratio of the equivalent disk diameter to the thickness of the disk or platelet. The weight average aspect ratio can be determined by melt pressing the composition in a press, microtoming sections perpendicular to the plane of the film and examining the section with transmission electron microscopy. The aspect ratio can be from 10 to 150 with the preferred range being 20 to 150.

The amount of platelet-type filler can range from 5 to 50 percent by weight and preferably from 15-30% by weight of the blend composition. Low amounts of filler produce only marginal improvement in barrier while large amounts of filler reduce the melt flow of the composite and are difficult to process.

Inorganic fillers for polymers are frequently surface treated to improve the interfacial adhesion between the particles and the polymer matrix. The typical surface modification include treatments with silanes, chromium compounds, zirconium compounds or titanium compounds. No surface treatments are required to obtain excellent interfacial adhesion between EVOH and mica although the use of surface treated micas is not precluded in this invention.

Optionally the compositions of this invention can contain 0.1 to 10 wt. % of aluminum flake. The compositions of this invention can be prepared by two methods. The first is a unique solution blending process at an intermediate stage in the conversion of the ethylene/vinyl acetate copolymer to EVOH pellets. At this step of the process the EVOH polymer is in solution in a methyl alcohol water mixture. The mica or any other filler can be easily blended at this step and the finishing precipitation, washing, drying and pelletizing carried out in the usual manner. This process has the advantage that only low amounts of shear energy are required to disperse the fillers in the low viscosity EVOH solution. Very little additional equipment is required beyond that required to manufacture conventional EVOH polymers.

The second process is a melt dispersion process in which the EVOH resin is melted in an extruder or melt compounding equipment and then blended with mica powder. Suitable polymer processing equipment includes but is not restricted to single screw extruders, twin screw extruders, Buss kneaders and Farrel continuous mixers. Twin screw extruders are preferred because of capacity, low equipment cost and completeness of dispersion. The mica and EVOH can be fed into a single port, however, separate feed locations in the extruder are preferred with the mica introduced downstream into a EVOH melt.

Melt temperatures during blending should be between 190° and 240° C. and, preferably, between 200° and 220° C. A vacuum port on the extruder is desirable and may be essential to remove the air introduced into the melt with the low bulk density mica powder.

The resulting EVOH-mica blends can then be pelletized for future use in barrier container manufactures or utilized in line for barrier container manufacture.

Ethylene vinyl alcohol copolymers are very sensitive to small amounts of acid or basic impurities. The presence of acid impurities causes the polymer to crosslink at melt temperature which results in an increase in the viscosity of the resin and a corresponding decrease in the melt flow value. The presence of basic impurities causes chain scission which results in a decrease in viscosity and an increase in melt flow.

It has been discovered that the mica filler used in an EVOH blend must be free of both acid and basic impurities. This can be checked by slurrying a quantity of the mica in deionized water and measuring the pH. The pH of the mica slurry should be between pH 6 and 8 and, preferably, between pH 6.5 and 7.5. The amount of mica in the slurry is not critical in determining pH. The use of mica fillers outside of the preferred pH range can be accomplished by addition of buffering agents to neutralize the acid or basic impurities. Phosphoric acid is an example of an additive which can be used to counteract basic impurities. Disodium hydrogen phosphate and calcium stearate are example of basic additives which can be used to counteract acidic impurities.

It is essential for the platelets to be aligned with their major plane parallel to the surface of the resulting barrier structure. This is achieved by the shear forces generated by most plastic forming operations.

Examples of polymer processing operations which produce the desired platelet orientation are film and sheet, blowmolding and shape extrusion and coextrusion processes, injection and coinjection molding processes and post extrusion such as solid phase pressure forming, melt thermoforming processes, and cuspation-dilation forming.

The compositions of the present invention consistently have oxygen permeation values (OPV) of 0.04 to 0.40 cc-mil/100 square inch-day-atm as measured at 80% RH and 30° C. and water vapor permeability test (WVTR) values of 0.2 to 2.0 g-mil/100 square inch day. This represents an improvement of at least 2/1 for OPV and 2/1 for WVTR over the unfilled ethylene/vinyl alcohol resins at a loading of 23% filler. These compositions can be used as the barrier component in flexible and rigid containers either as a single layer or as one of the layers in a multilayer structure. They have the advantage over conventional unmodified ethylene/vinyl alcohol copolymer resins in that they provide from two to ten times the oxygen barrier. These compositions also provide improved barrier to other permeants including water vapor, $CO_2$, flavors and odors. They are especially useful for the packaging of comestibles and other oxygen sensitive materials.

The multilayer structures of the present invention comprise at least one layer of a blend of ethylene/vinyl alcohol copolymer filled with mica and at least one layer of one or more structural resins. Structural thermoplastic resins include copolymers of olefins with vinyl or acrylic acid esters, ionomers, polyethylene terephthalate, amorphous copolyamides, polyethylene, polypropylene, ethylene homopolymers, polystyrene and copolymers and blends thereof. Preferred thermoplastic polymers include polyethylene terephthalate; polyvinyl chloride; polypropylene; linear and branched polyethylenes; co- and terpolymers of ethylene with vinyl acetate, acrylic acid or methacrylic acid, and ionomers obtained by partially neutralizing such acid copolymers.

In the multilayer structures of this invention, it may often be desirable to interpose between the layer of mica containing ethylene/vinyl alcohol copolymer and the layer of structural thermoplastic polymer a resin having adhesion to both layers. Many adhesive resins are known in the art which can serve this purpose from functional groups of free carboxylic acids, carboxylic acid salts, carboxylic acid esters, carboxylic acid amides, carboxylic anhydrides, carbonic acid esters, urethanes ureas or the like. In these thermoplastic polymers, the carbonyl group concentration may be changed in a broad range, but in general, it is preferred to use a thermoplastic polymer containing carbonyl groups at a concentration of 10 to 1400 millimoles per 100 g of the polymer, especially 30 to 1200 millimoles per 100 g of the polymer. Suitable adhesive resins include polyolefins modified with at least one ethylenically unsaturated monomer selected from unsaturated carboxylic acids and anhydrides, esters and amides thereof, especially polypropylene, high density polyethylene, low density polyethylene and ethylene/vinyl acetate copolymers modified with at least one member selected from acrylic acid, methacrylic acid, crotonic acid, fumaric acid, itaconic acid, maleic anhydride, itaconic anhydride, citraconic anhydride, ethyl acrylate, methyl methacrylate, ethyl maleate, 2-ethylhexyl acrylate, acrylamide, methacrylamide, fatty acid amides and imides of the acids described above. In addition, as the adhesive resin, there can be used ethylene-acrylate copolymers, ionomers, polyalkylene oxide-polyester block copolymers, carboxylmethyl cellulose derivatives, and blends of these polymers with polyolefins.

The multilayer structures of this invention have a minimum of two layers, the first layer of mica containing ethylene/vinyl alcohol copolymer and the second layer of structural thermoplastic resin. In some cases the structures have a third layer of an adhesive resin, the structures may also have five or more layers, e.g., two outer layers of the structural thermoplastic resin, an inner layer of the mica containing ethylene/vinyl alcohol copolymer, two or more layers of adhesive resin, and other inner thermoplastic resin layers as desired.

Other uses for plastic articles requiring a high oxygen barrier could utilize the composition of this invention. Such an example is a plastic pipe having an oxygenimpermeable casing for use as a heating pipe such as disclosed in U.S. Pat. No. 4,593,853.

EXAMPLES

Example 1

Four hundred grams of an ethylene/vinyl alcohol copolymer having an ethylene content of 44 mole % and having a melt flow of 12.0 g/10 minutes as measured at 210° C. with a 2160 g weight (ASTM D-1238) was dissolved in 2100 ml of a methanol-water solvent mixture containing 67 weight percent methanol while stirring at 65° C. To this solution was added 120 g (30 parts per hundred parts resin) of a water ground muscovite mica, having a particle size smaller than 400 mesh ($<3\mu$m). Information furnished by the supplier (Franklin Mineral Co.) gave a platelet size ranging from 2-2$\mu$m in the longest dimension with the average being 7$\mu$m long. The average particle thickness was 0.05$\mu$m giving an aspect ratio of 7/0.05 =140.

The polymer was precipitated by pouring into cold water and then chopped into small particles with a "Waring Blendor". The resulting material was filtered, dried, and re-extruded into pellets using a 30 mm twin screw extruder equipped with low shear screws and a vacuum venting port. The melt flow of the resulting EVOH/mica blend was 6.4g/10 min.

Film was extruded from this composite using a 14" (0.36$\mu$m) flat die, in gauges ranging from 0.9 to 2.9 mils (23-74$\mu$m). Oxygen permeation values measured on a 1.65 mil (42$\mu$m) film at 80% RH and 30° C. gave a value of 0.11 cc-mil/100 square-inch-day-atm. This compares to a value of 0.40 for the unmodified EVOH resin, representing a 3.6 X improvement in oxygen barrier.

A water vapor permeability test (WVTR) ASTM E-96, procedure E, gave a value of 0.43 g-mil/100 inch$^2$ day at 100° F. (37.8° C.), 95% relative humidity. This compares to 1.1 for the unmodified resin representing a 2.55 X improvement.

This blend was also blown into film. A 1.3 mil (3$\mu$m) film gave an OPV of 0.17 at 80% RH and 30° C. and a WVTR of 0.35.

Example 2

Ten (10) Kg of an ethylene vinyl alcohol copolymer having an ethylene content of 44 mole percent and a melt flow of 13.8 g/10 minutes was dissolved in 52 liters of a methanol-water solvent mixture containing 67 weight percent methanol while stirring at 65° C. To this solution was added 5 Kg of a water ground muscovite mica having a sieve analysis of >90% passing through 325 mesh (44 microns) screen. This product is reported by its supplier to have a high aspect ratio. The aspect ratio was found to be greater than 20 by microscopic analysis.

The blend was precipitated by pouring into cold deionized water, chopped in fine particles, filtered, and dried under vacuum at 80° C. The dried blend was re-extruded into pellets as in Example 1. The melt flow of this product was 2.5 g/10 minutes.

A 4.4 mil (112$\mu$m) film pressed from these pellets gave an OPV of 0.04 at 80% RH and 30° C. This compares to a value of 0.4 for a film of similar thickness for the unmodified polymer.

The WVTR was 0.31 compared to a value of 1.5 for pressed films of the unmodified polymer.

Example 3

Ten (10) Kg of an ethylene/vinyl alcohol copolymer having an ethylene content of 30 mole percent and a melt flow of 9.05 g/10 minutes was dissolved in 63 liters of methanol-water solvent mixture containing 55% methanol. To this solution was added 3 Kg of the mica of Example 2. The polymer was precipitated, chopped, filtered, dried, and pelletized as in Example 2. The melt flow of the blend was 3.3 g/10 minutes.

A 3.5 mil (89$\mu$m) pressed film gave an OPV of less than 0.05. This compared to 0.20 for the unmodified polymer. The WVTR was 0.46 compared to 2.5 without the platelet filler.

Example 4

The following example illustrates the use of a mixture of fillers, where mica platelets are added for barrier and TiO$_2$ is added for appearance.

Example 2 was repeated except that 3 Kg of a mixture containing 62.5% of the high aspect ratio muscovite mica used in Example 2 and 37.5% of TiO$_2$ was added to the polymer solution. The melt flow of the resulting blend was 7.9 g/10 min.

Flat die extruded films had an OPV of 0.15 and a WVTR of 0.38 for a 1.4 mil (36$\mu$m) film. These values represent improvements of 2.67 X and 3.70 X over the values for the unmodified polymer.

A portion of this film was microtomed to obtain cross-sections perpendicular to the surface of the film in both the machine and cross-machine direction. These were examined by transmission electron microscopy (TEM). The mica platelets were uniformly dispersed in the polymer matrix with the long axis of the platelets parallel to the film surface. TEM Measurements on the platelets in the blend showed that the aspect ratio of the typical particles was greater than 25/1.

Example 5

This example illustrates the use of two types of platelet-type fillers in an EVOH resin to obtain improved barrier properties. Five hundred (500) grams of the EVOH resin of Example 2 was dissolved in 2525 ml or a methanol-water mixture containing 67 weight percent methanol. To this solution was added 125 grams (25 phr) of the mica of Example 2 and 25 grams (5 phr) of aluminum flake. The polymer blend was isolated as in previous examples except that the wet precipitated polymer blend was mixed with acetone to speed the drying step. The resulting dried blend had a melt flow of 5.6 g/10 minutes.

A 3.2 mil (8$\mu$m) pressed film had a WVTR of 0.22. This represents a 6.8 X improvement over the barrier properties of the unmodified resin, and is superior to that obtained using mica alone.

Control Example A

This examples illustrates the marginal improvement in barrier which is obtained when a filler with a low aspect ratio is added to an EVOH barrier resin.

Five hundred (500) grams of an ethylene vinyl alcohol copolymer having an ethylene content of 44 mole percent and having a melt flow of 13.0 g/10 min. was dissolved in 2525 ml of a methanol-water solvent mixture containing 67 weight percent methanol. To this solution was added 150 grams (30 phr) of a talc filler. The talc was a "Talcron" 38-33 grade supplied by Pfizer Inc. and had a 38 micron maximum particle size and an oil absorbancy of 33. The product was worked up and pelletized as in Example 1. The melt flow of the blend was 6.6 g/10 minutes.

As in Example 1, films were extruded from this composite using a 14 inch (0.36m) die in gauges ranging from 1.0 to 3.2 mils (25 to 81μm) thickness.

A 1.4 mil (3μm) film gave an OPV of 0.18 at 80% RH and 30° C. An unfilled control filler under the same test conditions gave an OPV of 0.34. This represents only a 1.9 X improvement in oxygen barrier.

The WVTR of 1.1 mil (28μm) films was 1.06 compared to 1.39 for an unfilled control. This represents only a 1.3 X improvement in water vapor barrier.

Representative portions of these films were microtomed and examined by TEM. The cross-sections showed that most of the larger particles had a low aspect ratio in the range of 2–3, which would reduce the mass averaged aspect ratios to <6 in the blend.

Example 6

This example illustrates the use of a melt blending process to prepare the compositions of this invention.

A Werner & Pfleiderer 30 mm twin screw extruder was set up with two KTron solid feeders feeding into the rear port. These feeders were precalibrated to deliver 10 lbs/hr (4.5 kg/hr) of EVOH and 3 lbs/hour (1.4 kg/hr) of mica. The extruder was set up with a screw design to give good mixing but to avoid excess shear which could produce breakage of the mica platelets. A vacuum port near the discharge of the machine was maintained at 25 inches of Hg (85 KPa) to degas the blend and remove traces of moisture. At 80 RPM and a melt temperature of 210° C., excellent dispersion of the mica in the EVOH was obtained. The product was extruded through a 1-hole die, water quenched and strand cut into pellets.

Using an EVOH containing 44 mole percent ethylene and having a melt flow of 12 g/10 min and muscovite wet ground mica with 100% of the particles being finer than 400 mesh, yielded a product with a melt flow of 5.25g/10 min (K=0.019) and melt stability of 0.63. The OPV of films pressed from the blend gave a value less than 0.05. This compares to 0.20 for the unfilled base resin. The WVTR was 0.29 compared to a typical value of 1.5 for the base resin.

Samples of this product and a similar material made by solution blending were examined by both scanning electron microscope and by transmission electron miscroscopy and no difference in particle size distribution or aspect ratio of platelets was observed.

Example 7

A blend of an ethylene/vinyl alcohol copolymer containing 30 parts per hundred (phr) of mica was prepared in the following manner. Twenty-two lbs. (10 kg) of an ethylene/vinyl alcohol copolymer containing 44 mole percent ethylene and having a melt flow of 16 g/10 minutes was dissolved in a solvent mixture of 10 gallons of methyl alcohol and 4 gallons of water. When the polymer was completely dissolved, 6.6 lbs. (3 kg) of pigment grade mica Superfine Luster Pigment sold by Mearl Corp. was added. This is a very small particle size grade mica having 100% of the particles finer than 400 mesh (38μm). The average platelet diameter is reportedly in the 50–100μm range. The blend was stirred for several minutes, the pH adjusted to 4.5 with dilute caustic and then the polymer-mica mixture was precipitated by pouring into cold water. Substantially all of the mica was retained by the precipitating polymer. The precipitate was shredded in a Waring Blender, dewatered in a Nutsche filter, and vacuum dried at 80° C. The resulting dried flake was pelletized using a 30 mm W&P twin screw extruder using a low shear screw design to minimize breakage of the mica platelets. The melt flow of the resulting material was 7.9g/10 min.

This barrier resin blend was used to make 32 ounce Boston Round bottles on a Bekum five layer coextrusion blow molding machine. The inner and outer walls of the containers were layers of Shell WRS6-148 polypropylene approximately 13–14 mils (330–356,μm) thick with the centrally located ethylene/vinyl/alcohol/mica blend layer being 1.8–1.9 mils (5–8μm) thick. Thin adhesive layers, 0.2 to 0.3 mils thick, of a "Bynel" propylene polymer based coextrudable adhesive were used between the barrier and propylene layers.

The oxygen permeability of these bottles was tested on a MOCON oxygen analyzer after equilibrating the container at 100% humidity in the interior and at 50% RH on the outside. An average oxygen transmission rate (OTR) of 0.0012 cc/day container was measured at a test temperature of 22° C.

Some of the bottles were made without the adhesive layers. This allowed the barrier layer from the sidewalls to be separated from the polypropylene layer and evaluated for oxygen barrier in a MOCON flat film testing device. An oxygen permeability value (OPV) of 0.11 cc-mil/100 inch$^2$-day-atm was obtained at test conditions of 80% RH and 30° C.

Control Example B

A set of bottles were prepared under the conditions of Example 7 except that the ethylene/vinyl alcohol copolymer did not contain any platelet fillers Bottles tested under identical conditions as those from Example 1 gave an average OTR of 0.0045 cc/day-container. This value is 3.6 X higher than the mica filled sample.

Isolated barrier layer films from the side walls of the container gave an OPV of 0.33 cc-mils/100 inch$^2$-day-atm. This is 3.0 X higher than the mica filled material.

Example 8

Example 1 was repeated except that an ethylene/vinyl alcohol copolymer containing 30 mole percent ethylene and having a melt flow of 12 g/10 minutes was used. The mica used in this test was somewhat coarser, being a commercial water ground grade rated as 325 mesh. Wet screening tests showed this material to be 100% finer than 200 mesh (74μm) and 90% smaller than 325 (43μm). The mica loading was 30 phr as in Example 1. The melt flow of the blend was 3.3 g/10 minutes.

One of these bottles was filled with ketchup and the transparency compared with a similarly filled control bottle made without mica as described in Control Example C below. The appearance of the two bottles was substantially identical.

Bottles made with this composite as a barrier layer were made according to Example 7 and gave an average OTR of 0.0020.

Side wall barrier layer films gave an OPV of 0.10.

Control Example C

Control bottles for Example 7 were made from an unfilled ethylene/vinyl alcohol copolymer having an ethylene content of 30 mole % but with a melt flow of 7 g/10 minutes to more closely match the melt flow of the mica filled EVOH of Example 7.

Bottles made under identical conditions to those in Example 7 gave an OTR of 0.0030. This is 50% higher than the values from the filled barrier layer bottles of Example 7.

Side wall barrier layer film gave an OPV of 0.21. This is about 2 X greater than Example 7.

Example 9

A blend of ethylene/vinyl alcohol copolymer and a mica pigment of the same composition as Example 1 was coextruded on flat die coextrusion flat sheet line to reproduce a 5-layer 60 mil (1.5 mm) sheet. The outer layers were from a Shell 5820 polypropylene approximately 27–28 mils (0.69–0.71 mm) in thickness. The core consisted of EVOH/mica blend at a thickness of 4.4 mils (0.11 mm). Thin layers of a "Bynel" propylene polymer based coextrudable adhesive was used between the barrier and propylene layers.

In order to check the relative barrier of this construction, the adhesive layer was omitted and the sheet was drawn down at the die such that the barrier film layer down to a thickness of 1.37 $\mu$m could be separated and evaluated for oxygen barrier in a controlled humidity MOCON test apparatus. The OPV at 80% RH and 30° C. was 0.15.

A barrier layer film of the same resin but without the mica filler and prepared under identical conditions gave an OPV of 0.37. Therefore the mica filler gave a 2.5 factor improvement in oxygen barrier.

The 60 mil (1.5 mm) sheet was solid phase thermoformed on an Illig thermoforming machine to produce deep drawn cups, 70 mm in diameter and 100 mm in depth. Microscopic examination of the sidewalls showed that the barrier layer had uniformly thinned down to a continuous layer approximately 0.75 mils (19 m) thick. No breaks nor fractures in the barrier layer resulting from the deep draw were found.

Control Example D

In order to obtain an oxygen barrier as low as that of Example 9 using a non-mica filled ethylene/vinyl alcohol copolymer, it is necessary to use a copolymer with a low ethylene content in the range of 27 to 31 mole %. Example 9 was repeated except that the barrier layer was an unfilled ethylene/vinyl alcohol copolymer containing 30 mole % ethylene. Microscopic examination of the sidewalls from these deep drawn cups showed numerous breaks in the barrier layer.

I claim:

1. A multilayer structure comprising a first layer of structural thermoplastic polymer and a second layer of a composition comprising 50 to 95 percent by weight of an ethylene/vinyl alcohol copolymer having an ethylene content of 20 to 60 mole percent, a melt flow rate of from 0.1 to 100 g/10 minutes as measured at 210° C., and 50 to 5 percent by weight of mica wherein at least 95% by weight of the mica particles have a particle size of less than 38 microns, a platelet like shape and an aspect ratio of 10 to 150.

2. The multilayer structure of claim 1 wherein said second layer comprises 70 to 85% by weight ethylene/vinyl alcohol copolymer and from 30 to 15% by weight mica.

3. The multilayer structure of claim 2 wherein the ethylene/vinyl alcohol copolymer contains from 25 to 50 mole % ethylene.

4. The multilayer structure of claim 3 wherein the ethylene/vinyl alcohol copolymer has a melt flow rate of 1.3 to 30 g/10 minutes as measured at 210° C.

5. The multilayer structure of claim 1 wherein a layer of adhesive is interposed between said first layer and said second layer.

6. The multilayer structure of claim 5 wherein the layer of adhesive is a carboxyl modified polyolefin.

7. The multilayer structure of claim 5 comprising five layers, two outer layers of structural thermoplastic resin, a core layer of a blend of ethylene/vinyl alcohol copolymer and mica and interposed between said core layer and each of said outer layers, layers of adhesive resin.

8. The laminate of claim 1 in the form of a container.

9. The laminate of claim 8 in the form of a bottle.

* * * * *